J. W. BROADWATER.
WATER SAVING VALVE.
APPLICATION FILED SEPT. 19, 1911.
1,020,184.
Patented Mar. 12, 1912.
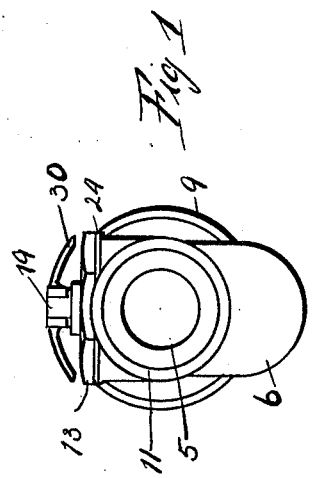
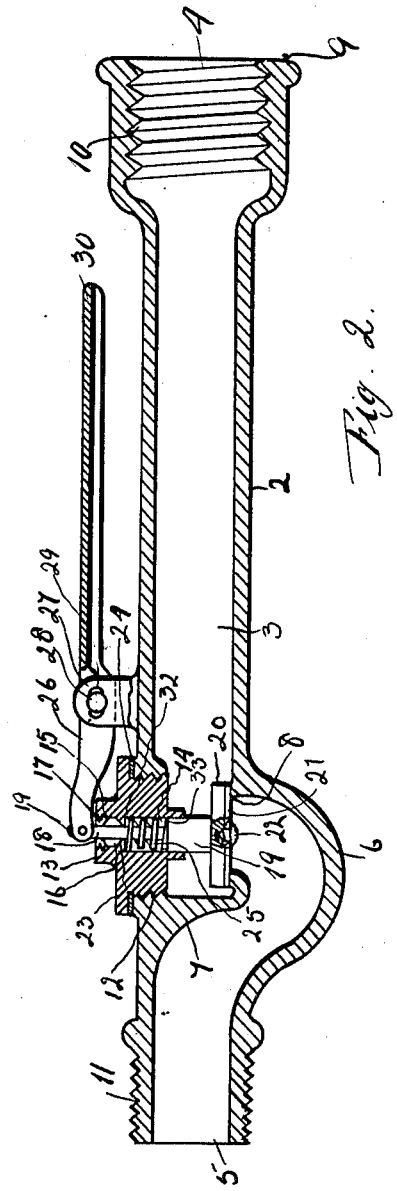
Witnesses
Francis O. Pocock
M. H. LoRee
Inventor
John W. Broadwater
By H. H. Williamson
Attorney

UNITED STATES PATENT OFFICE.

JOHN W. BROADWATER, OF PHILADELPHIA, PENNSYLVANIA.

WATER-SAVING VALVE.

1,020,184. Specification of Letters Patent. Patented Mar. 12, 1912.

Application filed September 19, 1911. Serial No. 650,228.

*To all whom it may concern:*

Be it known that I, JOHN W. BROADWATER, a citizen of the United States, residing at Philadelphia, in the county of Philadelphia and State of Pennsylvania, have invented a certain new and useful Improvement in Water-Saving Valves, of which the following is a specification.

My invention relates to new and useful improvements in water saving valves for hose, and has for its object to provide an exceedingly simple and effective device of this character which may be applied to a hose and is situated between the hose and nozzle, thus making it convenient for the operator to hold the valve from its seat while the hose is being used for watering purposes.

Another object of the invention is to improve this class of device, so that it will readily shut off the water when the hose is laid down, or when the operator desires to discontinue the use of the water, and to also produce a shut-off which may be used with any hose of standard size without changing the construction of the nozzle.

By the use of my improved valve, a great amount of water is saved, as for instance, when washing vehicles and the like, the water is sprinkled on the object, and the hose then laid aside while the scrubbing operation takes place. Often the operator is standing a considerable distance from the faucet to which the hose is attached and he will not take time and trouble to go to the faucet to shut off the water, therefore, it is allowed to run, but in using a hose with my attachment, as soon as the handle is released, the valve disk will be forced upon its seat and effectually shut off the water, and the device is always ready for use, and by a slight pressure of the hand, the valve may be opened. The mounting of my water saving valve between the hose and nozzle makes it convenient for the operator to use, since it acts as a holder for the operator to support the hose.

With these ends in view, this invention consists in the details of construction and combination of elements hereinafter set forth and then specifically designated by the claim.

In order that those skilled in the art to which this invention appertains may understand how to make and use the same, I will describe its construction in detail, referring by letter to the accompanying drawing forming a part of this specification.

Figure 1 is an end view of my improved water saving valve for hose, and Fig. 2 a longitudinal sectional view thereof.

In carrying out my invention as here embodied, 2 represents the body of the device in the form of a pipe having a passage way 3 therethrough leading from the inlet 4 to the outlet 5. The body is provided with an off-set 6, and into this extends the integral wall or partition 7, the lower edge of which forms a portion of the valve seat 8. The inlet end of the body is preferably enlarged as at 9, being provided with the internal threads 10, for engagement of the threads of the coupling upon the end of the hose, while the outlet end of the body is threaded externally as at 11, for the reception of the nozzle. In the body above the valve seat is formed the threaded opening 12, in which is mounted the cap 13 provided with a central opening 14, a portion of which is enlarged and threaded as at 15 to form the stuffing box for the packing 16 which is held in place by the threaded plug 17, having a central opening 18 through which passes the reduced portion of the valve stem 19, carrying the valve disk 20 on which is mounted a washer 21, of an approved construction held in place by a screw 22, or its equivalent. The cap 13 has formed therewith, a flange 23 between which and the body may be mounted a packing washer 24. The valve plug is normally held in engagement with its seat through the medium of a helical spring 25, one end of which engages the shoulder 32 formed by the different diameters of the central opening while the opposite end rests upon the shoulder 33, of the valve stem. The outer end of the valve stem 19 is pivoted to the short end of the operating handle or lever 26, which is mounted in the bracket 27, the construction for mounting this lever being here shown as comprising a pin 28, or its equivalent, mounted in the lever and passing through suitable slots 29 formed in the bracket 27, said slots giving the lever sufficient freedom of motion to permit the valve stem to move in a straight line without binding against its surrounding parts. The free end of the lever 26 preferably curves laterally to conform with the curvature of the body, so that when depressed for opening the valve, it will lie snugly against the body, thus more readily fitting the hand of the operator.

When in use, it being understood that the water has first been turned into the hose, the body of my valve is taken into the hand of the operator, and the free end of the lever depressed which will remove the valve plug from its seat and at the same time depress the helical spring 25 permitting the water to pass through the body into the nozzle. As soon as the lever 26 is released the spring 25 will force the valve plug upon its seat and effectually shut off the water. By the construction here shown, when the water is shut off the pressure thereof will be upon the valve disk and will assist the spring in holding said disk securely upon the seat.

Of course I do not wish to be limited to the exact details of construction as here described, as these may be varied within the limits of the appended claim without departing from the spirit of my invention.

Having thus fully described my invention, what I claim as new and useful, is—

A water saving valve for hose comprising a body having an off-set therein, and provided with a threaded opening adjacent the off-set, a valve seat formed at the entrance to the off-set, a threaded cap for said opening having a central opening, a portion of said central opening being enlarged to form a stuffing box, and packing in said stuffing box, a threaded plug having a central opening mounted in the enlarged central opening of the cap, a valve disk, a stem carried thereby passing through the central opening in the cap, a washer, means for holding said washer to the disk, a bracket formed with the body, said bracket having slots therein, an operating lever having one end thereof pivoted to the valve stem, the handle portion of the operating lever being curved lateral to conform to the curvature of the body, a pin passing through the operating lever and journaled in the slots in the bracket for pivoting said operating lever to said bracket, and a helical spring engaging the cap and valve stem for normally holding said valve disk upon its seat.

In testimony whereof, I have hereunto affixed my signature in the presence of two subscribing witnesses.

JOHN W. BROADWATER.

Witnesses:
M. H. L. REE,
EDW. W. AUSTIN.